United States Patent [19]

Lee et al.

[11] Patent Number: 5,165,852

[45] Date of Patent: Nov. 24, 1992

[54] ROTATION ENHANCED ROTOR BLADE COOLING USING A DOUBLE ROW OF COOLANT PASSAGEWAYS

[75] Inventors: Ching-Pang Lee, Cincinnati; Theodore T. Thomas, Jr., Loveland, both of Ohio

[73] Assignee: General Electric Company, Cincinnati, Ohio

[21] Appl. No.: 629,855

[22] Filed: Dec. 18, 1990

[51] Int. Cl.$^5$ .............................................. B63H 1/14
[52] U.S. Cl. ..................................... 416/97 R; 416/95
[58] Field of Search ................... 416/95, 97 R, 97 A, 416/96 R; 415/115

[56] References Cited

U.S. PATENT DOCUMENTS

| | | | |
|---|---|---|---|
| 2,956,773 | 12/1960 | French | 253/39.15 |
| 3,628,885 | 12/1971 | Sidenstick | 416/97 |
| 3,844,678 | 10/1974 | Sterman et al. | 416/97 |
| 3,891,348 | 6/1975 | Auxier | 416/97 |
| 4,073,599 | 2/1978 | Allen et al. | 416/97 |
| 4,180,373 | 12/1979 | Moore et al. | 416/97 |
| 4,236,870 | 12/1980 | Hucul et al. | 416/97 |
| 4,257,737 | 3/1982 | Andress et al. | 416/97 |
| 4,312,624 | 1/1982 | Steinbauer et al. | 415/115 |
| 4,474,532 | 10/1984 | Pazder | 416/97 |
| 4,604,031 | 8/1986 | Moss et al. | 416/97 |
| 4,627,480 | 12/1986 | Lee | 164/369 |
| 4,684,322 | 8/1987 | Clifford et al. | 416/97 R |
| 4,786,233 | 11/1988 | Shizuya et al. | 416/97 |

FOREIGN PATENT DOCUMENTS

| | | | |
|---|---|---|---|
| 0230917 | 8/1987 | European Pat. Off. | 416/97 R |
| 0135606 | 7/1985 | Japan | 416/96 R |
| 2100807 | 1/1983 | United Kingdom | 416/97 R |

OTHER PUBLICATIONS

"Heat Transfer in Rotating Passages with Smooth Walls and Radial Outward Flow" by J. H. Wagner, B. V. Johnson and T. J. Hajek, presented at the Gas Turbine and Aeroengine Congress and Exposition on Jun. 4-8, 1989, Toronto, Canada.

"Heat Transfer in Rotating Serpentine Passages with Smooth Walls", by J. H. Wagner, B. V. Johnson and F. C. Kopper, presented at the Gas Turbine and Aeroengine Congress and Exposition on Jun. 11-14, Brussels, Belgium.

Primary Examiner—Thomas E. Denion
Attorney, Agent, or Firm—Douglas E. Erickson; Jerome C. Squillaro

[57] ABSTRACT

A rotor blade such as a turbine rotor blade for a jet engine. The airfoil blade portion of the rotor blade has a plurality of longitudinally extending coolant passageways preferably interconnected to define a serpentine coolant circuit. Passageways channeling coolant from the blade root to the blade tip are positioned in a first row proximate the pressure side of the airfoil blade while passageways channeling coolant from the blade tip to the blade root are positioned in a second row adjacent the first row and proximate the suction side of the airfoil blade to take advantage of the Coriolis force acting on the coolant in the passageways of the rotating blade to improve overall heat transfer effectiveness.

10 Claims, 2 Drawing Sheets

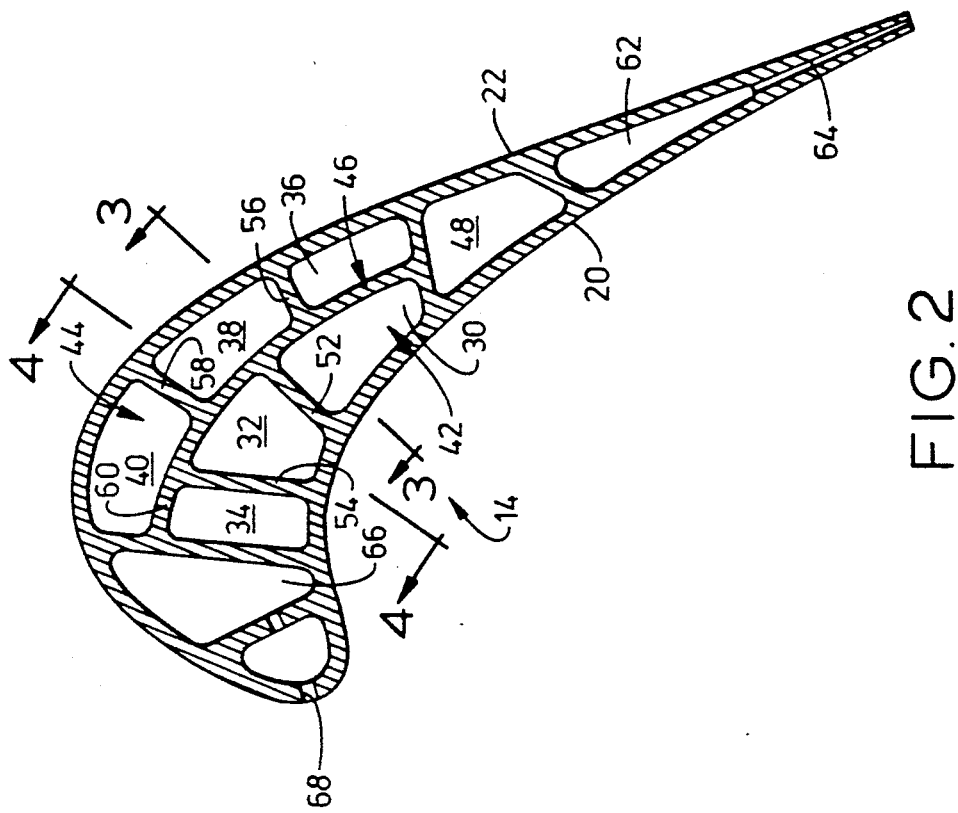
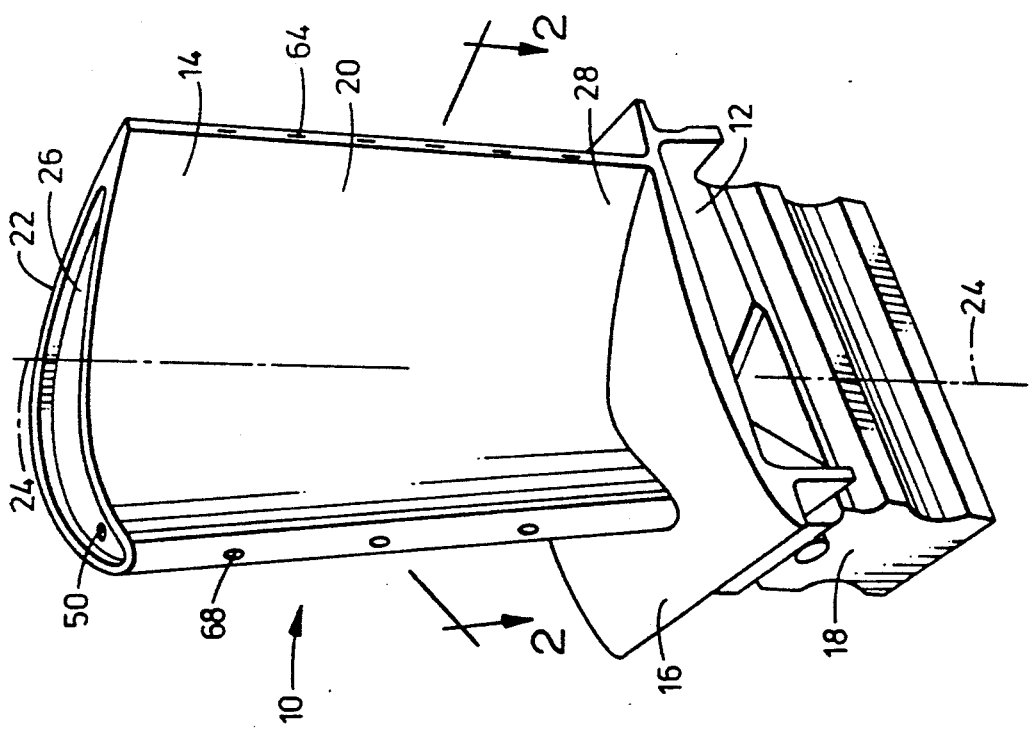
FIG. 2
FIG. 1

ROTATION ENHANCED ROTOR BLADE COOLING USING A DOUBLE ROW OF COOLANT PASSAGEWAYS

CROSS-REFERENCE TO RELATED APPLICATIONS

Reference is hereby made to the following copending applications dealing with related subject matter and assigned to the assignee of the present invention:
1. The inventors of the present invention have concurrently filed a related patent application entitled "Rotation Enhanced Rotor Blade Cooling Using A Single Row Of Coolant Passageways".
2. "Internally Cooled Airfoil Blade" by Ching-Pang Lee et al, filed Oct. 12, 1989, and assigned U.S. Ser. No. 07/415,756.

BACKGROUND OF THE INVENTION

The present invention relates generally to rotor blades (such as those used in turbines, compressors, fans, and the like in a gas turbine engine), and more particularly to such a rotor blade having improved internal cooling.

Gas turbine engines, such as aircraft jet engines, include turbines having rotor blades. A turbine rotor blade has a shank which is attached to a rotating turbine rotor disk and an airfoil blade which is employed to extract useful work from the hot gasses exiting the engine's combustor. The airfoil blade includes a blade root which is attached to the shank and a blade tip which is the free end of the airfoil blade. Modern aircraft jet engines have employed internal cooling of turbine rotor blades to keep the airfoil blade temperatures within design limits. Typically, the airfoil blade portion of the turbine rotor blade is cooled by air (typically bled from the engine's compressor) passing through a longitudinally extending cylindrical internal passage, with the air entering near the airfoil blade root and exiting near the airfoil blade tip. Known turbine blade cooling passages include a cooling circuit comprising a plurality of unconnected longitudinally-oriented passages each receiving cooling air from near the airfoil blade root and channeling the air longitudinally toward the airfoil blade tip. Other known cooling circuits include a serpentine cooling circuit comprising a plurality of longitudinally-oriented passages which are series-connected to produce serpentine flow. For either cooling circuit, some air also exits the airfoil blade through film cooling holes near the airfoil blade's leading edge, and some air exits the airfoil blade through trailing edge cooling holes.

Cooling passages typically have circular, rectangular, square or oblong transverse cross-sectional shapes. It is known that for a rotating airfoil blade having a serpentine cooling circuit including longitudinally-oriented cooling passages of square cross-sectional shape, Coriolis (rotation) forces will increase the heat transfer coefficient (by a factor of more than two in one reported experiment) along certain walls of the passage and decrease the heat transfer coefficient (by a factor of more than two in the reported experiment) along other walls of the passage as compared with a non-rotating airfoil. Basically, the Coriolis force is proportional to the vector cross product of the velocity vector of the coolant flowing through the passage and the angular velocity vector of the rotating airfoil blade. The Coriolis force compresses the coolant against one side of the square passage increasing the heat transfer at that side while decreasing the heat transfer at the opposite side. This creates an uneven transverse cross section blade temperature profile which creates hot areas that must be compensated for by, for example, increasing the cooling flow. Increasing the cooling flow could be accomplished by bleeding off more engine compressor air, but this would reduce the engine's efficiency by reducing the number of miles flown for each gallon of fuel consumed. What is needed is a cooling passage configuration which takes advantage of, rather than suffers from, the effects of Coriolis forces on the effectiveness of transferring heat from the airfoil blade to the coolant.

SUMMARY OF THE INVENTION

It is an object of the invention to provide a rotor blade having improved internal cooling.

It is an added object of the invention to provide such a rotor blade which takes advantage of, rather than suffers from, the effects of Coriolis forces on heat transfer effectiveness in a rotating airfoil.

It is an additional object of the invention to provide such a rotor blade which achieves a more uniform transverse cross section blade temperature profile.

In a first embodiment of the invention, the rotor blade includes a shank and an airfoil blade. The airfoil blade has a pressure side and a suction side joined together to define an airfoil shape. The airfoil blade additionally has a blade tip and a blade root, with the blade root attached to the shank. The airfoil blade also has a longitudinal axis extending outward toward the blade tip and inward toward the blade root. The airfoil blade further has walls defining a first generally longitudinally extending coolant passageway for channeling coolant longitudinally outward and defining a second generally longitudinally extending coolant passageway for channeling coolant longitudinally inward. The first coolant passageway is positioned near the pressure side of the airfoil blade, and the second coolant passageway is positioned adjacent the first passageway and near the suction side of the airfoil blade. The passageways are interconnected to define at least a portion of a serpentine coolant circuit. As the rotor blade rotates, Coriolis force will compress the coolant in the first passageway against the pressure side and will compress the coolant in the second passageway against the suction side of the airfoil blade increasing its heat transfer effectiveness. The Coriolis force will also decompress the coolant in the passageways from the interior region of the airfoil blade between the adjacent passageways decreasing this region's heat transfer effectiveness. The invention compensates for these Coriolis (rotation) effects since it increases the heat transfer effectiveness of the hotter pressure and suction sides of the airfoil blade which require the most cooling and decreases the heat transfer effectiveness of the colder interior region of the blade between the adjacent passageways which requires the least cooling.

In a second embodiment of the invention, the rotor blade includes a shank and an airfoil blade. The airfoil blade has a pressure side and a suction side joined together to define an airfoil shape. The airfoil blade additionally has a blade tip and a blade root, with the blade root attached to the shank. The airfoil blade also has a longitudinal axis extending outward toward the blade tip and inward toward the blade root. The airfoil blade further has walls defining at least two first generally longitudinally extending coolant passageways for channeling coolant longitudinally outward and defining at least two second generally longitudinally extending coolant passageways for channeling coolant longitudinally inward. The first coolant passageways are positioned in a first row, and the second coolant passageways are positioned in a second row. The first row is positioned near the pressure side of the airfoil blade, and the second row is positioned adjacent the first row and near the suction side of the airfoil blade. The rows are interconnected to define at least a portion of a serpentine coolant circuit. AS the rotor blade rotates, Coriolis force will compress the coolant against the pressure and suction sides of the airfoil blade and will decompress the coolant from the interior region of the blade between the adjacent rows, just as in the first embodiment previously discussed.

In a preferred embodiment, the passageways of the rows each have a transverse cross-sectional shape of generally a quadrilateral, and the walls include first wall portions separating adjacent passageways of the first row and extending from the pressure side toward a passageway of the second row. The walls also include second wall portions separating adjacent passageways of the second row, offset from the first wall portions, and extending from the suction side toward a passageway of the first row. A single wall portion of the walls separates the passageways of the first row from adjacent passageways of the second row, wherein the first and second wall portions each intersect this single wall portion at generally a right angle.

Several benefits and advantages are derived from the invention which provides a rotor blade, such as a turbine blade of a gas turbine engine, with improved internal cooling. The serpentine cooling circuit employs a double row of longitudinally extending coolant passageways to take advantage of the effects of Coriolis force on heat transfer effectiveness in coolant passageways of rotating rotor blades. The invention positions the first row of passageways near the pressure side of the airfoil blade for radially outward flow (from blade root to blade tip) and positions the second row of passageways near the suction side of the airfoil blade for radially inward flow (from blade tip to blade root) to achieve a more uniform transverse cross section blade temperature profile. Such a design increases the heat transfer at the hotter pressure and suction sides (while decreasing the heat transfer in the colder interior region of the blade between the adjacent rows) so that a turbine rotor blade may be cooled using less cooling air. Since the cooling air is typically bled from the compressor, minimizing the amount of air required for cooling purposes will leave more air for the combustor which will increase engine efficiency.

BRIEF DESCRIPTION OF THE DRAWINGS

The accompanying drawings illustrate a preferred embodiment of the present invention wherein:

FIG. 1 is a perspective view of a gas turbine engine rotor blade which incorporates the invention;

FIG. 2 is a cross sectional view of the airfoil blade portion of the rotor blade of FIG. 1 taken along lines 2—2 of FIG. 1 showing the double row of coolant passageways;

DETAILED DESCRIPTION OF THE INVENTION

Figure 4:
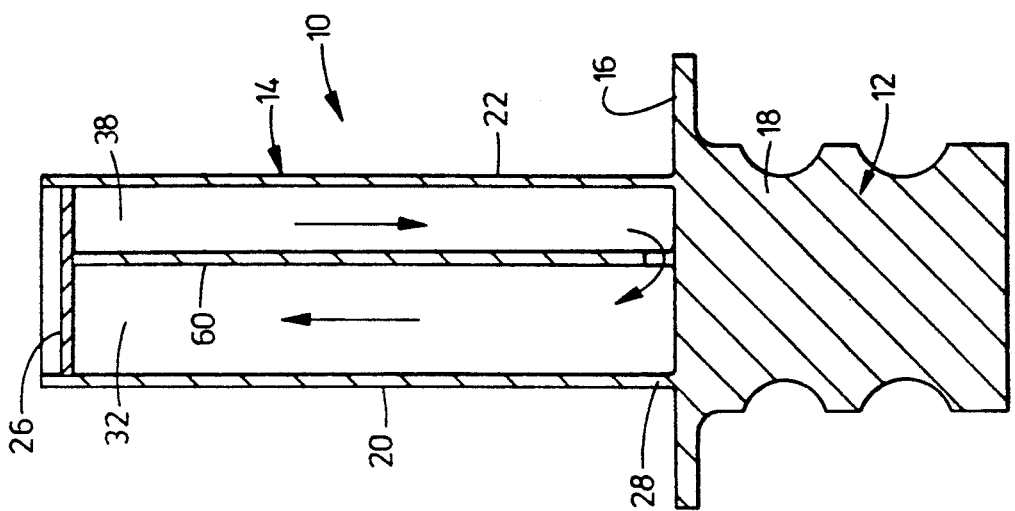
FIGS. 3 and 4 are a cross sectional views of the rotor blade of FIG. 1 taken along lines 3—3 and 4—4, respectively, of FIG. 2 showing the serpentine coolant circuit interconnection between a passageway of second row with two passageways of the first row.

A gas turbine engine rotor blade, shown in FIG. 1 as an aircraft jet engine turbine rotor blade 10, includes a shank 12 and an airfoil blade 14. The shank 12 includes a blade platform 16, which helps to radially contain the turbine air flow, and a dovetail 18, which attaches to a turbine rotor disc (not shown). The airfoil blade 14 has a concave-shaped or pressure side 20 and a convex-shaped or suction side 22 which are joined together to define an airfoil shape. A longitudinal axis 24 extends radially outward toward the blade tip 26 and radially inward toward the blade root 28 which is attached to the shank 12. The rotor blade rotates in a direction such that its airfoil blade pressure side 20 follows its airfoil blade suction side 22. Therefore, the rotor blade 10 shown in FIG. 1 would rotate into the page.

Figure 3:
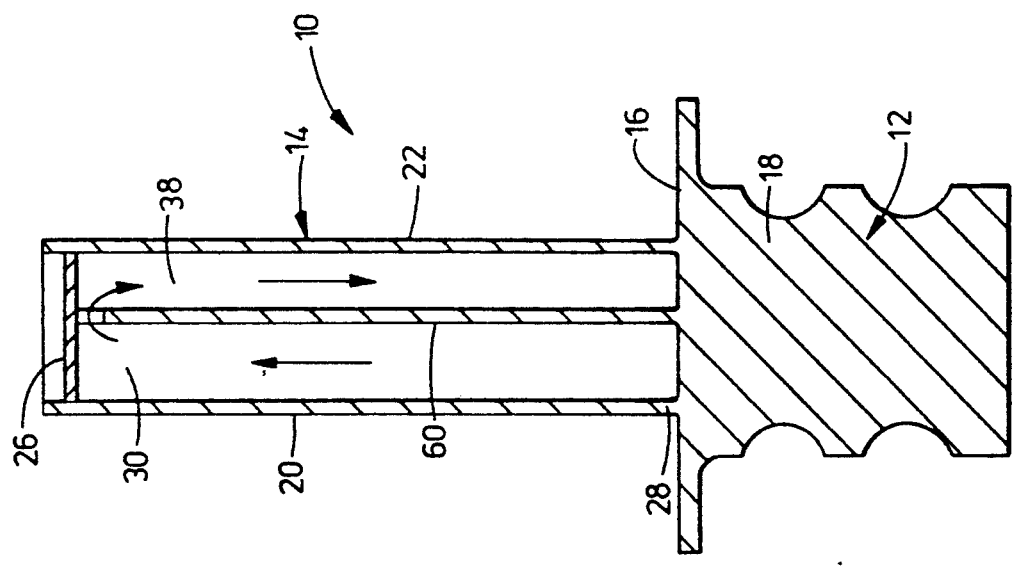

As shown in FIGS. 2, 3, and 4, the airfoil blade further has walls defining a first plurality of generally longitudinally extending coolant passageways 30, 32, and 34 for channeling coolant longitudinally (radially) outward toward the blade tip 26 and defining a second plurality of generally longitudinally extending coolant passageways 36, 38, and 40 for channeling coolant longitudinally (radially) inward toward the blade root 28. In the figures, the unnumbered arrows denote the direction of coolant flow. Preferably, these longitudinally extending coolant passageways each have a transverse cross-sectional shape of generally a quadrilateral. The outward channeling first passageways 30, 32, and 34 are disposed in a first row 42, and the inward channeling second passageways 36, 38, and 40 are disposed in a second row 44. The first row 42 is disposed proximate the pressure side 20 of the airfoil blade 14, and the second row 44 is disposed adjacent the first row 42 and proximate the suction side 22 of the airfoil blade 14.

The rows 42 and 44 are interconnected to define at least a portion of a serpentine coolant circuit 46. The serpentine circuit 46 also includes outward channeling passageway 48 which receives coolant from a coolant entranceway (not shown) in the shank 12, as is known to those skilled in the art. In particular, outward channeling beginning passageway 48 interconnects with adjacent inward channeling passageway 36 which interconnects with adjacent outward passageway 30 which interconnects with adjacent inward passageway 38 which interconnects with adjacent outward passageway 32 which interconnects with adjacent inward passageway 40 which interconnects with adjacent outward passageway 34. Coolant exits outward passageway 34 through holes 50 in the blade tip 26.

The walls include longitudinally extending first wall portions 52 and 54 separating adjacent passageways 30 and 32 and 32 and 34 of said first row 42. First wall portion 52 extends from the pressure side 20 toward passageway 38 of the second row 44, and first wall portion 54 extends from the pressure side 20 toward passageway 40 of the second row 44.

Likewise, the walls include longitudinally extending second wall portions 56 and 58 separating adjacent passageways 36 and 38 and 38 and 40 of said second row 44. Second wall portion 56 extends from the suction side 22 toward passageway 30 of the first row 42, and second wall portion 58 extends from the suction side 22 toward passageway 32 of the first row 42. Thus, the second wall portions 56 and 58 are seen to be offset from the first wall portions 52 and 54.

The walls additionally include at least one (and preferably a single) longitudinally extending third wall portion 60 separating the passageways 30, 32, and 34 of the first row 42 from adjacent passageways 36, 38, and 40 of the second row 44. Preferably, the first wall portions 52 and 54 and the second wall portions 56 and 58 each intersect the single wall portion 60 at generally a right angle.

In an alternate embodiment, the first and second wall portions 52 and 54 and 56 and 58 would be replaced by other wall portions (not shown) extending between the pressure and suction sides 20 and 22 of the airfoil blade 14 to align the passageways 30, 32, and 34 of the first row 42 with the passageways 36, 38, and 40 of the second row 44. That is, one passageway (e.g., 32) of the first row 42 and one passageway (e.g., 38) of the second row 44 would be bound between adjacent other wall portions. The single wall portion 60 would serve to separate the passageways 30, 32, and 34 of the first row 42 from adjacent passageways 36, 38, and 40 of the second row 44.

Although not part of the present invention, the rotor blade also includes trailing edge and leading edge cooling circuits with coolant entering a trailing edge conduit 62 and exiting through trailing edge openings 64 and with coolant entering a leading edge conduit 66 and exiting through leading edge film cooling hole openings 68.

It is noted that the invention provides an improved gas turbine engine internally cooled rotor blade, one which compensates for, and takes advantage of, Coriolis (rotation) effects on heat transfer effectiveness. It is understood that the rotor blade of the invention is not limited to aircraft jet engines but may be incorporated into other gas turbine engines or into any rotating machinery having a turbine, compressor, booster, or fan blade, or the like, and that the coolant may be a gas (such as air) and/or a liquid.

The foregoing description of a preferred embodiment of the invention has been presented for purposes of illustration. It is not intended to be exhaustive or to limit the invention to the precise form disclosed, and obviously many modifications and variations are possible in light of the above teachings all of which are within the scope of the claims appended hereto.

We claim:

1. A rotor blade comprising a shank and an airfoil blade, said airfoil blade having:
   (a) a pressure side;
   (b) a suction side, said sides joined together to define an airfoil shape;
   (c) a blade root attached to said shank;
   (d) a blade tip;
   (e) a longitudinal axis extending outward toward said blade tip and inward toward said blade root; and
   (f) walls defining a first generally longitudinally extending coolant passageway for channeling coolant longitudinally outward and defining a second generally longitudinally extending coolant passageway for channeling coolant longitudinally inward, with said first passageway disposed proximate said pressure side of said airfoil blade and said second passageway disposed between said first passageway and said suction side of said airfoil blade and proximate said suction side of said airfoil blade and with said first passageway interconnected with said second passageway for receiving coolant from said second passageway to define at least a portion of a serpentine coolant circuit.

2. The rotor blade of claim 1, wherein said passageways each have a transverse cross-sectional shape of generally a quadrilateral.

3. A rotor blade comprising a shank and an airfoil blade, said airfoil blade having:
   (a) a pressure side;
   (b) a suction side, said sides joined together to define an airfoil shape;
   (c) a blade root attached to said shank;
   (d) a blade tip;
   (e) a longitudinal axis extending outward toward said blade tip and inward toward said blade root; and
   (f) walls defining a first plurality of generally longitudinally extending coolant passageways for channeling coolant longitudinally outward and defining a second plurality of generally longitudinally extending coolant passageways for channeling coolant longitudinally inward, said first plurality of passageways disposed in a first row and said second plurality of passageways disposed in a second row, with said first row disposed proximate said pressure side of said airfoil blade and said second row disposed between said first row and said suction side of said airfoil blade and proximate said suction side of said airfoil blade and with said rows interconnected to define at least a portion of a serpentine coolant circuit.

4. The rotor blade of claim 3, wherein said passageways of said rows each have a transverse cross-sectional shape of generally a quadrilateral.

5. The rotor blade of claim 3, wherein said walls include first wall portions separating adjacent said passageways of said first row and wherein at least one of said first wall portions extends from said pressure side toward a said passageway of said second row.

6. The rotor blade of claim 5, wherein said walls include second wall portions separating adjacent said passageways of said second row and wherein at least one of said second wall portions is offset from said first wall portions and extends from said suction side toward a said passageway of said first row.

7. The rotor blade of claim 6, wherein said walls include at least one-third wall portion separating said passageways of said first row from adjacent said passageways of said second row.

8. The rotor blade of claim 7, wherein said at least one-third wall portion consists of a single wall portion.

9. The rotor blade of claim 8, wherein said first wall portions and said second wall portions each intersect said single wall portion.

10. A rotor blade comprising a shank and an airfoil blade, said airfoil blade having:
    (a) a pressure side;
    (b) a suction side, said sides joined together to define an airfoil shape;
    (c) a blade root attached to said shank;
    (d) a blade tip;
    (e) a longitudinal axis extending outward toward said blade tip and inward toward said blade root; and
    (f) walls defining a first plurality of generally longitudinally extending coolant passageways for channeling coolant longitudinally outward and defining a second plurality of generally longitudinally extending coolant passageways for channeling coolant longitudinally inward, said first plurality of passageways disposed in a first row and said second plurality of passageways disposed in a second row, with said first row disposed proximate said pressure side of said airfoil blade and said second row disposed adjacent said first row and proximate said suction side of said airfoil blade and with said rows interconnected to define at least a portion of a serpentine coolant circuit, wherein:

(1) said passageways of said rows each have a transverse cross-sectional shape of generally a quadrilateral,
(2) said walls include first wall portions separating adjacent said passageways of said first row and extending from said pressure side toward a said passageway of said second row,
(3) said walls include second wall portions separating adjacent said passageways of said second row, offset from said first wall portions, and extending from said suction side toward a said passageway of said first row,
(4) said walls include a single wall portion separating said passageways of said first row from adjacent said passageways of said second row, and
(5) said first wall portions and said second wall portions each intersect said single wall portion at generally a right angle.

* * * * *